(12) United States Patent
Su (10) Patent No.: US 12,177,065 B2
(45) Date of Patent: Dec. 24, 2024

(54) METHOD, APPARATUS, ELECTRONIC DEVICE AND STORAGE MEDIUM FOR RESOURCE OPERATION

(71) Applicant: Beijing Volcano Engine Technology Co., Ltd., Beijing (CN)

(72) Inventor: Sai Su, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/677,426

(22) Filed: May 29, 2024

(65) Prior Publication Data
US 2024/0314021 A1    Sep. 19, 2024

Related U.S. Application Data

(63) Continuation of application No. PCT/CN2023/078982, filed on Mar. 1, 2023.

(30) Foreign Application Priority Data

Mar. 28, 2022 (CN) .......................... 202210316708.2

(51) Int. Cl.
  *G06F 15/173* (2006.01)
  *H04L 9/40* (2022.01)
  (Continued)

(52) U.S. Cl.
  CPC .......... *H04L 41/08* (2013.01); *H04L 63/0218* (2013.01); *H04L 63/0272* (2013.01); *H04L 12/4641* (2013.01)

(58) Field of Classification Search
  CPC . H04L 41/08; H04L 63/0218; H04L 63/0272; H04L 12/4641
  See application file for complete search history.

(56) References Cited

U.S. PATENT DOCUMENTS

| | | |
|---|---|---|
| 5,613,139 A | 3/1997 | Brady |
| 9,923,784 B2 * | 3/2018 | Chitti .................. H04L 41/0896 |

(Continued)

FOREIGN PATENT DOCUMENTS

| | | | | |
|---|---|---|---|---|
| AU | 2014278314 A1 * | 1/2016 | ........... | G06F 9/5077 |
| CA | 2914802 A1 * | 12/2014 | ........... | G06F 9/5077 |

(Continued)

OTHER PUBLICATIONS

International Patent Application No. PCT/CN2023/078982; Int'l Search Report; dated Apr. 20, 2023; 3 pages.

(Continued)

*Primary Examiner* — Richard G Keehn
(74) *Attorney, Agent, or Firm* — BakerHostetler (57) ABSTRACT

The application provides a method, apparatus, electronic device and storage medium for resource operation. When performing a target operation on an elastic network card, according to the elastic network interface, an associated resource having a dependency relationship with the elastic network interface is determined. According to the target operation, a lock parameter for locking the elastic network interface and the associated resource is set. After performing the target operation on the locked elastic network interface, a lock parameter for unlocking the elastic network interface and the associated resource is set. A private network does not need to be locked, but an elastic network card to be operated and an associated resource dependent thereon are locked.

20 Claims, 6 Drawing Sheets

(51) Int. Cl.
    *H04L 41/08*     (2022.01)
    *H04L 12/46*     (2006.01)

(56) References Cited

U.S. PATENT DOCUMENTS

| | | | | |
|---|---|---|---|---|
| 11,119,739 | B1* | 9/2021 | Allen | H04L 63/0263 |
| 11,405,360 | B1* | 8/2022 | Bose | H04L 63/0272 |
| 11,516,050 | B2* | 11/2022 | Dawani | H04L 12/4641 |
| 11,916,880 | B1* | 2/2024 | Allen | H04L 63/0263 |
| 2014/0365549 | A1* | 12/2014 | Jenkins | G06F 9/526 |
| | | | | 709/201 |
| 2017/0286517 | A1 | 10/2017 | Horowitz et al. | |
| 2019/0149436 | A1* | 5/2019 | Park | H04L 47/788 |
| | | | | 709/226 |
| 2019/0171966 | A1* | 6/2019 | Rangasamy | G06F 11/3006 |
| 2020/0007569 | A1* | 1/2020 | Dodge | H04L 63/1441 |
| 2020/0067933 | A1* | 2/2020 | Kukreja | H04L 63/104 |
| 2022/0311744 | A1* | 9/2022 | Shevade | H04L 63/0272 |
| 2023/0164113 | A1* | 5/2023 | Gupta | H04L 61/5061 |
| | | | | 709/245 |

FOREIGN PATENT DOCUMENTS

| | | | | |
|---|---|---|---|---|
| CN | 105283838 | A | 1/2016 | |
| CN | 106130891 | A | 11/2016 | |
| CN | 109271258 | A | 1/2019 | |
| CN | 111314461 | A | 6/2020 | |
| CN | 111367682 | A | 7/2020 | |
| CN | 111818081 | A | 10/2020 | |
| CN | 112148695 | A | 12/2020 | |
| CN | 112866306 | A | 5/2021 | |
| CN | 113806031 | A | 12/2021 | |
| CN | 114679465 | A | 6/2022 | |
| JP | 6333967 | B2 * | 5/2018 | G06F 9/5077 |

OTHER PUBLICATIONS

China Patent Application No. 202210316708.2; Office Action; dated Nov. 15, 2023; 10 pages (contains English Translation).

* cited by examiner

METHOD, APPARATUS, ELECTRONIC DEVICE AND STORAGE MEDIUM FOR RESOURCE OPERATION

This application is a continuation of International Patent Application No. PCT/CN2023/078982, filed on Mar. 1, 2023, which claims priority to Chinese Patent Application No. 202210316708.2 entitled "METHOD, APPARATUS, ELECTRONIC DEVICE, AND STORAGE MEDIUM FOR RESOURCE OPERATION" filed on Mar. 28, 2022, both of which are incorporated herein by reference in their entireties.

FIELD

The present application relates to the field of network technologies, and in particular, to a method, apparatus, electronic device, and storage medium for resource operation.

BACKGROUND

A private network (for example, Virtual Private Cloud, VPC) is a private network resource of a user on a public cloud, and the user can freely configure various types of resources in the private network, thereby implementing specific functions. Generally, when a user operates a resource in the private network, the private network will be locked. Only after the resource operation is completed, other resources in the private network can be operated. That is, the resource operations in the private network are serial operations, and the performance is not high.

SUMMARY

In view of this, the purpose of the present application is to propose a method, apparatus, electronic device and storage medium for resource operation.

Based on the described purpose, the present application provides a method of resource operation, comprising:
  receiving a resource operation request, wherein the resource operation request is used for indicating to perform a target operation on an elastic network interface;
  determining, according to the elastic network interface, an associated resource having a dependency relationship with the elastic network interface, wherein the associated resource comprises at least one of: a sub-network for allocating an address to the elastic network interface, a security group for binding the elastic network interface, or a computing instance for mounting the elastic network interface;
  setting, according to the target operation, a lock parameter for locking the elastic network interface and the associated resource; and
  setting, after performing the target operation on the locked elastic network interface, a lock parameter for unlocking the elastic network interface and the associated resource.

Optionally, the target operation is to create the elastic network interface, and the lock parameter comprises a lock state and the number of read locks;
  setting, according to the target operation, the lock parameter for locking the elastic network interface and the associated resource comprises:
  setting a lock state of the elastic network interface as adding write lock; and
  setting lock states of the sub-network and the security group both as adding read lock, and increasing the number of read locks of each of the sub-network and the security group by one; and
  setting the lock parameter for unlocking the elastic network interface and the associated resource comprises:
  setting the lock state of the elastic network interface as unlock; and
  decreasing the number of read locks of the sub-network and the number of read locks of the security group by one, and in response to the number of read locks of the sub-network and/or the security group being zero, setting the lock state of the sub-network and/or the security group as unlock.

Optionally, the target operation is to delete the elastic network interface, and the lock parameter comprises a lock state and the number of read locks;
  setting, according to the target operation, the lock parameter for locking the elastic network interface and the associated resource comprises:
  setting a lock state of the elastic network interface as adding write lock; and
  setting the lock state of the security group as adding read lock, and increasing the number of read locks by one; and
  setting the lock parameter for unlocking the elastic network interface and the associated resource comprises:
  setting the lock state of the elastic network interface as unlock; and
  decreasing the number of read locks of the security group by one, and in response to the number of read locks of the security group being zero, setting the lock state of the security group as unlock.

Optionally, the target operation is to mount the elastic network interface to the computing instance, and the lock parameter comprises a lock state;
  setting, according to the target operation, the lock parameter for locking the elastic network interface and the associated resource comprises:
  setting lock states of the elastic network interface and the computing instance both as adding write lock; and
  setting the lock parameter for unlocking the elastic network interface and the associated resource comprises:
  setting the lock states of the elastic network interface and the computing instance both as unlock.

Optionally, the target operation is to unload the elastic network interface from the computing instance, and the lock parameter comprises a lock state and the number of read locks;
  setting, according to the target operation, the lock parameter for locking the elastic network interface and the associated resource comprises:
  setting a lock state of the elastic network interface as adding write lock; and
  setting a lock state of the computing instance as adding read lock, and increasing the number of read locks of the computing instance by one; and
  setting the lock parameter for unlocking the elastic network interface and the associated resource comprises:
  setting the lock state of the elastic network interface as unlock; and
  decreasing the number of read locks of the computing instance by one, and in response to the number of read locks of the computing instance being zero, setting the lock state of the computing instance as unlock.

Optionally, the target operation is to bind or unbind the elastic network interface and the security group, and the lock parameter comprises a lock state;
  setting, according to the target operation, the lock parameter for locking the elastic network interface and the associated resource comprises:
  setting a lock state of the elastic network interface as adding write lock; and setting a lock state of the security group as adding read lock, and adding the number of read locks of the security group by one; and
  setting the lock parameter for unlocking the elastic network interface and the associated resource comprises:
  setting the lock state of the elastic network interface as unlock; and
  decreasing the number of read locks of the security group by one, and in response to the number of read locks of the security group being zero, setting the lock state of the security group as unlock.

Optionally, the lock parameter further comprises a lock annotation for identifying the target operation.

Optionally, setting, according to the target operation, the lock parameter for locking the elastic network interface and the associated resource further comprises:
  setting, according to the target operation, a state of the elastic network interface to be performing the target operation; and
  setting the lock parameter for unlocking the elastic network interface and the associated resource further comprises:
  setting the state of the elastic network interface to be completing the target operation.

Optionally, after receiving the resource operation request, the method further comprises:
  receiving a query request for a resource state, wherein the query request for the resource state is used for indicating to query the state of the elastic network interface; and
  sending a state result response comprising the state of the elastic network interface.

Optionally, performing the target operation on the locked elastic network interface comprises:
  calling at least one component associated to the elastic network interface to sequentially perform the target operation.

Based on the same concept, the present application further provides an apparatus for resource operation, comprising:
  a receiving module configured to receive a resource operation request, wherein the resource operation request is used for indicating to perform a target operation on an elastic network interface;
  a resource determining module configured to determine, according to the elastic network interface, an associated resource having a dependency relationship with the elastic network interface, wherein the associated resource comprises at least one of: a sub-network for allocating an address to the elastic network interface, a security group for binding the elastic network interface, or a computing instance for mounting the elastic network interface;
  a lock setting module configured to set, according to the target operation, a lock parameter for locking the elastic network interface and the associated resource; and
  an unlocking module configured to set, after performing the target operation on the locked elastic network interface, a lock parameter for unlocking the elastic network interface and the associated resource.

Based on the same concept, the present application further provides an electronic device, comprising a memory, a processor, and a computer program stored in the memory and run on the processor, wherein the processor, when executing the program, implements the method as described above.

Based on the same concept, the present application further provides a non-transitory computer readable storage medium having computer instructions stored therein, wherein the computer instructions are used to enable a computer to perform the method as described above.

BRIEF DESCRIPTION OF THE DRAWINGS

To describe the technical solutions in the present application or the related art more clearly, the following briefly introduces the accompanying drawings required for describing the embodiments or the related art. Apparently, the accompanying drawings in the following description show merely embodiments of the present application, and a person of ordinary skill in the art may still derive other accompanying drawings from these accompanying drawings without creative efforts.

DETAILED DESCRIPTION

The following will refer to several example embodiments to describe the principles and spirit of the present application. It should be understood that these implementations are provided only to enable those skilled in the art to better understand and implement the present application, and not to limit the scope of the present application in any way. On the contrary, these implementations are provided to make the present application more thorough and complete, and to fully convey the scope of the present application to those skilled in the art.

According to the implementations of the present application, a method, apparatus, electronic device and storage medium for resource operation are provided.

Herein, it should be understood that the number of elements in the figures is used for examples rather than limitations, and any naming is only for differentiation and does not have any restrictive meaning.

Below, with reference to several representative implementations of the present application, a detailed explanation of the principles and spirit of the present application will be provided.

In related technologies, when operating on resources in the private network, the private network will be locked, and the locked private network may no longer operate on other resources in it. This mechanism makes resource operations of the private network a serial operation mode. After one resource operation is completed, the private network unlocks, and then performs the operation of the next resource. For example, when creating a sub-network in the private network, the private network will be locked until the creation of the sub-network is completed. During private network locking, other resources in the private network cannot be performed any operations. The performance of the serial operation mode is not high, especially in some scenarios where a large amount of concurrent resource operations may occur in the private network. For example, in Platform as a Service (Paas) scenarios, high concurrency network interfaces need to be created in the private network, and the serial operation mode obviously cannot meet this demand.

To solve the above problem, the present application provides a method of resource operation. By setting lock parameter for various resources in the private network, when a resource is operated, the lock parameter of the resource and its dependent associated resource are set. When the set lock parameter is a read lock, it supports concurrent operation of the resource. When the set lock parameter is a write lock, it monopolizes the resource to avoid errors.

Figure 1:
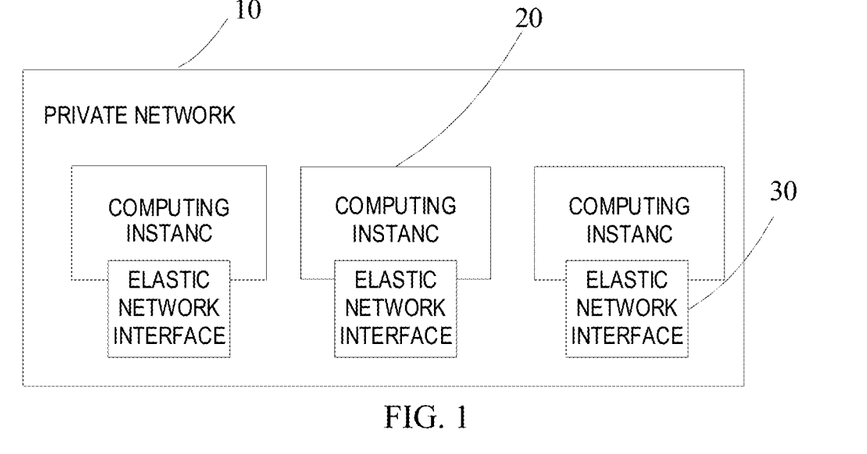
FIG. 1 is a schematic diagram of an application scenario of the embodiments of the present application.

Refer to FIG. 1, which is a schematic diagram of an application scenario of a method of resource operation provided by the embodiments of the present application. This application scenario includes a private network 10, where multiple computing instances (for example, ECS) 20 may be configured, and the computing instance 20 may be bound to a predetermined number of elastic network interface (ENI) 30. Herein, the private network is a private network resource on a public cloud. Users may freely configure routing tables, network addresses, security group, etc. in the private network, and use various cloud resources such as cloud servers, cloud databases, etc. in the private network. The computing instance 20 is a computing unit with processing capacity and elastic expansion capacity. Sub-networks may be divided on the computing instance 20 to achieve operations such as creation and deletion of sub-networks. The elastic network interface 30 may be mounted to the computing instance 20, and the IP address may be allocated through the sub-network, or it may be unloaded from the computing instance 20. When creating the elastic network interface 30, the elastic network interface 30 must be bound to the security group to achieve traffic management of the elastic network interface 30.

The following describes the method of resource operation according to the example embodiments of the present application in combination with the application scenario of FIG. 1. It should be noted that the above application scenarios are only shown for the purpose of facilitating the understanding of the spirit and principles of the present application, and the implementations of the present application are not limited in this regard. On the contrary, the implementations of the present application may be applied to any applicable scenario.

Figure 2:
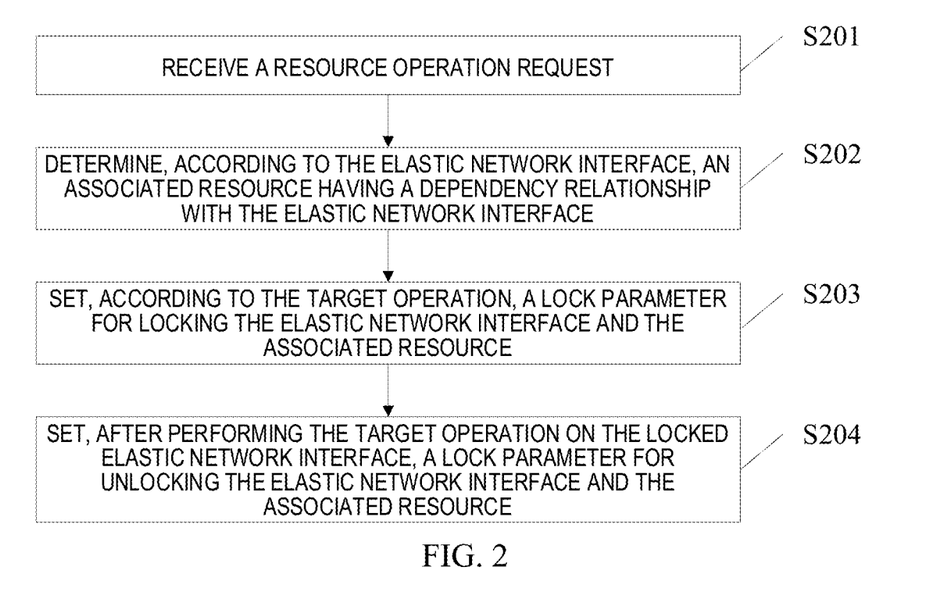
FIG. 2 is a flow chart of a method of the embodiments of the present application.

First, as shown in FIG. 2, the embodiments of the present application provide a method of resource operation, including the following steps.

At S201: receive a resource operation request, where the resource operation request is used for indicating to perform a target operation on an elastic network interface.

In this embodiment, the user may perform related operations on various resources in the private network. The resources in the private network include but are not limited to sub-networks, security groups, elastic network interfaces, computing instances, routing tables, etc. Users may configure various resources on a configuration page of the private network, such as creating/deleting sub-networks, creating/deleting security groups, creating/deleting elastic network interfaces, mounting/unloading elastic network interface, binding/unbinding an elastic network interface with a security group, etc. When configuring network interface resources, a resource operation request that require a target operation on the elastic network interface is sent.

At S202: determine, according to the elastic network interface, an associated resource having a dependency relationship with the elastic network interface.

In this embodiment, various resources in the private network have dependency relationship. By sorting out the dependency relationship among resources, it is determined how to lock the elastic network interface and the associated resource that has a dependency relationship with it when the target operation is performed on the elastic network interface, so as to ensure that the locked elastic network interface may complete target operation without errors.

Figure 3:
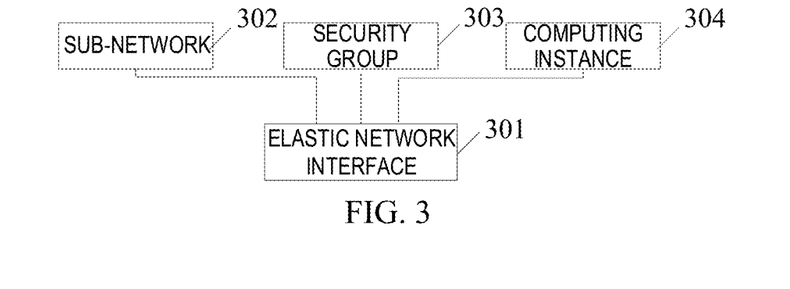
FIG. 3 is a schematic diagram of resource dependency relationship of the embodiments of the present application.

Referring to FIG. 3, in some implementations, it is considered that an elastic network interface 301 will be performed highly concurrent operations in some scenarios, and the elastic network interface 301 and the associated resource that has a dependency relationship with it are determined. For example, since the elastic network interface 301 needs to be allocated network addresses from a sub-network 302, there is a dependency relationship between the elastic network interface 301 and the sub-network 302, and the elastic network interface 301 depends on the sub-network 302. When performing related operations on the elastic network interface 301, the sub-network 302 should exist and cannot be deleted. Since the elastic network interface 301 must be bound to a specific security group 303, there is a dependency relationship between the elastic network interface 301 and the security group 303, and the elastic network interface 301 depends on the security group 303. When performing related operations on the elastic network interface 301, the security group 303 should exist and cannot be deleted. Since the elastic network interface 301 is to be mounted to a computing instance 304, there is a dependency relationship between the elastic network interface 301 and the computing instance 304, and the elastic network interface 301 depends on the computing instance 304. When performing related operations on the elastic network interface 301, the computing instance 304 should exist and cannot be deleted.

In S203: set, according to the target operation, a lock parameter for locking the elastic network interface and the associated resource.

In this embodiment, after determining the elastic network interface and the associated resource that has a dependency relationship with it, according to the target operation on the elastic network interface, the lock parameter of the elastic network interface and the lock parameter of the associated resource are set to ensure the correctness of the elastic network interface operation, while achieving the concurrency of the resource operation.

Herein, lock parameters of various resources include a lock state, the number of read locks, and a lock annotation. The lock state is used to identify whether the resource is added a lock and a type of adding the lock. The lock state includes unlock, adding read lock, and adding write lock. When adding read lock is applied to the resource, the lock state is set as adding read lock. When adding write lock is applied to the resource, the lock state is set as adding write lock. When no lock is applied to the resource, the lock state is set as unlock. The number of read lock is used to identify the number of adding read lock added to resources. For example, when creating elastic network interfaces A, B, C simultaneously, and adding read lock on the sub-network, and when creating the elastic network interface A, the number of read locks on the sub-network is increased by one; when creating the elastic network interface B, the number of read locks on the sub-network is increased by one; when creating the elastic network interface C, the number of read locks on the sub-network is increased by one. The number of read lock may be used to record the number of concurrent operations on the sub-network. The lock annotation is used to identify a content of target operation, which facilities to quickly locate a problem when it occurs.

Taking the elastic network interface as an example, when creating the elastic network interface, it is necessary to add write lock to the created elastic network interface to avoid other operations on the elastic network interface when the elastic network interface has not been successfully created. Because creating the elastic network interface requires allocating network addresses from the sub-network, and binding the elastic network interface to a specific security group, it is necessary to add read lock to the sub-network and security group on which the elastic network interface depends. On the one hand, the sub-network and security group after adding read lock cannot be written (for example, deletion or modification operations), which may ensure the correctness of creating the elastic network interface. On the other hand, other resources may still read the sub-network and security group, so as to achieve concurrent operations on the sub-network and security group.

In S204: set, after performing the target operation on the locked elastic network interface, a lock parameter for unlocking the elastic network interface and the associated resource.

In this embodiment, after locking the elastic network interface and its dependent associated resource, the target operation may be performed on the elastic network interface. After the target operation of the locked elastic network interface is completed, the elastic network interface and its dependent associated resource are unlocked, thereby releasing the elastic network interface and associated resource for subsequent operations.

This embodiment provides a method of resource operation, including receiving a resource operation request, determining an associated resource having a dependency relationship with the elastic network interface according to the elastic network interface, setting a lock parameter for locking the elastic network interface and the associated resource according to the target operation, and setting a lock parameter for unlocking the elastic network interface and the associated resource after performing the target operation on the locked elastic network interface. When operating on resources in the private network, the private network is not locked, but the elastic network interface to be operated and its dependent associated resource are locked. In this way, operations on resources in the private network other than the elastic network interface and the associated resource are not affected. In addition, resources with adding read lock support concurrent operations.

In some embodiments, the target operation is to create the elastic network interface, the associated resource includes the sub-network used to allocate addresses to the elastic network interface and the security group used to bind the elastic network interface, and the lock parameter includes a lock state and the number of read locks;

setting, according to the target operation, the lock parameter for locking the elastic network interface and the associated resource comprises:

setting a lock state of the elastic network interface as adding write lock; and setting lock states of the sub-network and the security group both as adding read lock, and increasing the number of read locks of each of the sub-network and the security group by one; and setting the lock parameter for unlocking the elastic network interface and the associated resource comprises:

setting the lock state of the elastic network interface as unlock; and decreasing the number of read locks of the sub-network and the number of read locks of the security group by one, and in response to the number of read locks of the sub-network and/or the security group being zero, setting the lock state of the sub-network and/or the security group as unlock.

In this embodiment, when creating the elastic network interface, the sub-network and security group that have a dependency relationship with the elastic network interface are determined. When creating the elastic network interface, the lock state of the elastic network interface is set as adding write lock, the lock states of the sub-network and security group are set as adding read lock, and the number of read lock is increased by one. After the elastic network interface with adding write lock is created, the lock state of the elastic network interface is set as unlock, the number of read locks of the sub-network and the security group is decreased by one, and when judging that the number of read locks of the sub-network and/or the security group is zero, the lock state(s) of the sub-network and/or the security group is set as unlock, thus completing the creation of the elastic network interface. Adding write lock to the elastic network interface to ensure that no other operations can be performed on the elastic network interface during the creation process to avoid errors. Adding read lock to the sub-network and security group may ensure that the elastic network interface can no longer be written during the creation process, so as to avoid errors due to the deletion or modification of the resources that the elastic network interface depends on during the creation process. At the same time, the sub-network and security group with adding read lock may further perform read operations, that is, support concurrent read operations, for example, the concurrent creation of elastic network interface under the sub-network and security group.

Figure 4:
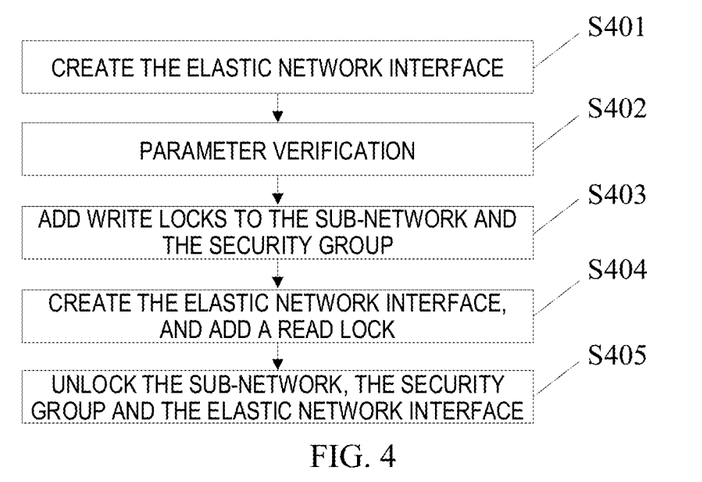
FIG. 4 is a schematic diagram of a method flow chart of creating a network interface of the embodiments of the present application.

As shown in FIG. 4, for example, at step 401, an operation request is received to create an elastic network interface. At step 402, the operation request is verified, including whether the parameters of the elastic network interface comply with the requirements, and whether the sub-network and security group that the elastic network interface depends on exist. At step 403, if the parameter verification passes, the lock states of the sub-network and the security group are set as adding read lock, and the number of read locks is increased by one. At step 404, the elastic network interface is created, the lock state of the elastic network interface is set as adding write lock, the network address is allocated to the elastic network interface for the sub-network, and the elastic network interface is bound to the security group. At step 405, the sub-network, security group and elastic network interface are unlocked, and the number of read locks of the sub-network and security group is decreased by one. If the number of read locks is zero, the lock state is set as unlock, and the lock state of the elastic network interface is set as unlock. It can be seen that during the creation of the elastic network interface, the elastic network interface may be added write lock, and no other operations may be performed. The sub-network and security group may be added read lock, and concurrent read operations may be performed on the sub-network and security group. It can also be understood that when creating the elastic network interface, the sub-network and security group that it depends on should exist, rather than monopolizing the sub-network and security group. Therefore, only adding read lock is need instead of adding write lock, so that multiple elastic network interface may be created concurrently.

In some embodiments, the target operation is to delete the elastic network interface, the associated resource includes a security group used to bind the elastic network interface, and the lock parameter includes a lock state and the number of read locks;
  setting, according to the target operation, the lock parameter for locking the elastic network interface and the associated resource comprises:
  setting a lock state of the elastic network interface as adding write lock; and setting the lock state of the security group as adding read lock, and increasing the number of read locks by one; and
  setting the lock parameter for unlocking the elastic network interface and the associated resource comprises:
  setting the lock state of the elastic network interface as unlock; and
  decreasing the number of read locks of the security group by one, and in response to the number of read locks of the security group being zero, setting the lock state of the security group as unlock.

In this embodiment, when the elastic network interface is deleted, the security group that has a dependency relationship with the elastic network interface is determined. When deleting the elastic network interface, the lock state of the elastic network interface is set as adding write lock, the lock state of the security group is set as adding read lock, and the number of read locks is increased by one. After deleting the elastic network interface with adding write lock, the lock state of the elastic network interface is set as unlock, the number of read locks of the security group is decreased by one, and when judging that the number of read locks of the security group is zero, the lock state of the security group is set as unlock, thus completing the deletion of the elastic network interface. Adding write lock to the elastic network interface may ensure that no other operations can be performed on the elastic network interface during the creation process to avoid errors; adding read lock to the security group may ensure that the elastic network interface can no longer be written during the deletion process, so as to avoid errors due to the deletion or modification of the resources that the elastic network interface depends on during the deletion process. At the same time, the security group with adding read lock may further perform read operations, that is, it supports concurrent read operations, for example, the concurrent deletion of the elastic network interface under the security group.

Figure 5:
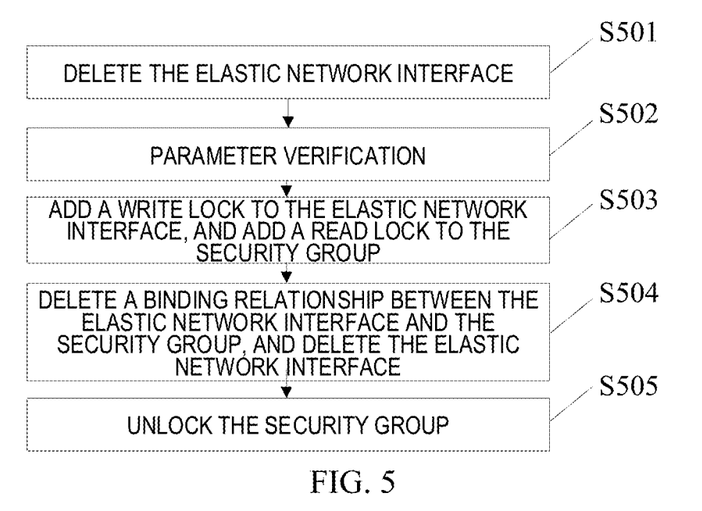
FIG. 5 is a schematic diagram of a method flow chart of deleting a network interface of the embodiments of the present application.

As shown in FIG. 5, for example, at step 501, an operation request to delete the elastic network interface is received. At step 502, the operation request is verified, including whether the parameters of the elastic network interface comply with the requirements, and whether the security group on which the elastic network interface depends exists. At step 503, if the parameter verification passes, the lock state of the elastic network interface is set as adding write lock, the lock state of the security group is set as adding read lock, and the number of read locks is increased by one. At step 504, a binding relationship between the elastic network interface and the security group is deleted, and the elastic network interface is deleted. At step 505, the security group is unlocked, and the number of read locks of the security group is decreased by one. If the number of read locks is zero, the lock state is set as unlock. It can be seen that in the process of deleting the elastic network interface, the elastic network interface is added write lock, and no other operations can be performed. The security group is added read lock, and concurrent read operations may be performed on the security group. It can also be understood that when deleting the elastic network interface, the security group it depends on should exist instead of monopolizing the security group, so only adding read lock is needed instead of adding write lock, thus multiple elastic network interfaces bound to the security group may be deleted concurrently. It should be noted that deleting the elastic network interface does not require locking the sub-network on which the elastic network interface depends (neither adding read lock nor adding write lock). This is because as long as there is an elastic network interface under the sub-network, the sub-network cannot be deleted. Therefore, when deleting the elastic network interface, the sub-network cannot be deleted, which may ensure the existence of the sub-network. Based on this, deleting the elastic network interface does not require locking the sub-network, which may ensure the correctness of the operation and reduce the processing complexity.

In some embodiments, the target operation is to mount the elastic network interface to the computing instance, the associated resource includes a computing instance for mounting the elastic network interface, and the lock parameter includes a lock state;
  setting, according to the target operation, the lock parameter for locking the elastic network interface and the associated resource comprises:
  setting lock states of the elastic network interface and the computing instance both as adding write lock; and
  setting the lock parameter for unlocking the elastic network interface and the associated resource comprises:
  setting the lock states of the elastic network interface and the computing instance both as unlock.

In this embodiment, when the elastic network interface is mounted, the computing instance that has a dependency relationship with the elastic network interface is determined. When mounting the elastic network interface, the lock state of the elastic network interface is set as adding write lock, and the lock state of the computing instance is set as adding write lock. After the elastic network interface with adding write lock is mounted, the lock state of the elastic network interface is set as unlock, and the lock state of the computing instance is set as unlock, thus completing the mounting of the elastic network interface. Adding write lock to both the elastic network interface and the computing instance to achieve the exclusive operation of the elastic network interface over the computing instance, which may ensure that the elastic network interface cannot perform other operations during the mounting process and ensure the correctness of the mounting operation.

Figure 6:
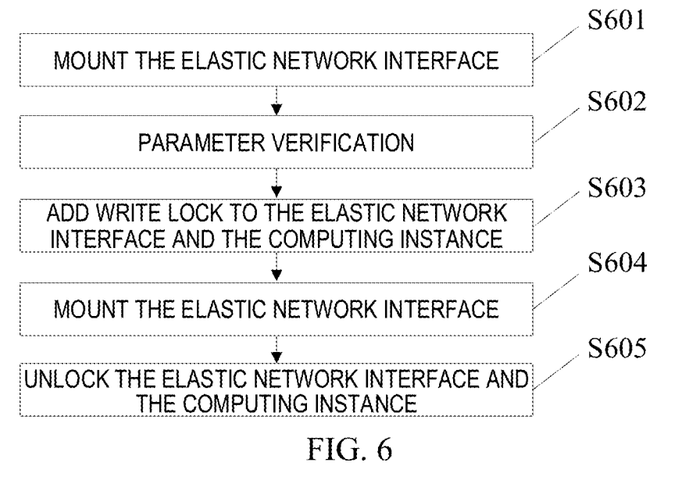
FIG. 6 is a schematic diagram of a method flow chart of mounting a network interface of the embodiments of the present application.

As shown in FIG. 6, for example, at step 601, an operation request for mounting the elastic network interface is received. At step 602, the operation request is verified, including whether the parameters of the elastic network interface comply with the requirements, and whether the computing instance on which the elastic network interface depends exists. At step 603, if the parameter verification passes, the lock state of the elastic network interface is set as adding write lock, and the lock state of the computing instance is set as adding write lock. At step 604, the elastic network interface is mounted on the computing instance. At step 605, the elastic network interface and the computing instance are unlocked, and the lock states of the elastic network interface and the computing instance are set as unlock. It can be seen that during the process of mounting the elastic network interface, the elastic network interface monopolizes the computing instance, the elastic network interface and the computing instance cannot perform other operations. This is because the number of elastic network interfaces that may be mounted to the computing instance is limited. When an elastic network interface is mounted, the computing instance is needed to be added write lock. The computing instance judges whether the number of predetermined network interfaces is exceeded after the elastic network interface is mounted. If the number of network interfaces is exceeded, the elastic network interface cannot be mounted again, that is, the mount fails. If the number of network interfaces is not exceeded, the elastic network interface may be mounted. Therefore, concurrent operations are not supported when the elastic network interface is mounted to the computing instance.

In some embodiments, the target operation is to unload the elastic network interface from the computing instance, the associated resource includes a computing instance used to mount or unload the elastic network interface, and the lock parameter include a lock state and the number of read locks;

setting, according to the target operation, the lock parameter for locking the elastic network interface and the associated resource comprises:
setting a lock state of the elastic network interface as adding write lock; and setting a lock state of the computing instance as adding read lock, and increasing the number of read locks of the computing instance by one; and
setting the lock parameter for unlocking the elastic network interface and the associated resource comprises:
setting the lock state of the elastic network interface as unlock; and
decreasing the number of read locks of the computing instance by one, and in response to the number of read locks of the computing instance being zero, setting the lock state of the computing instance as unlock.

In this embodiment, when the elastic network interface is unloaded from the computing instance, the computing instance that has a dependency relationship with the elastic network interface is determined. When unloading the elastic network interface, the lock state of the elastic network interface is set as adding write lock, the lock state of the computing instance is set as adding read lock, and the number of read locks is increased by one. After the elastic network interface with adding write lock is unloaded, the lock state of the elastic network interface is set as unlock, and the number of read locks of the computing instance is decreased by one. When the number of read locks is zero, the lock state is set as unlock to complete the unloading of the elastic network interface. Adding write lock to the elastic network interface to ensure that no other operations may be performed on the elastic network interface during the mounting process to avoid errors. Adding read lock to the computing instance may ensure that the elastic network interface may no longer be written during the unloading process, so as to avoid errors caused by the deletion or modification of the resources that the elastic network interface depends on during the mounting process. At the same time, the computing instance with adding read lock may also perform read operations, that is, it supports concurrent read operations, for example, the concurrent unloading of the elastic network interface under the computing instance.

Figure 7:
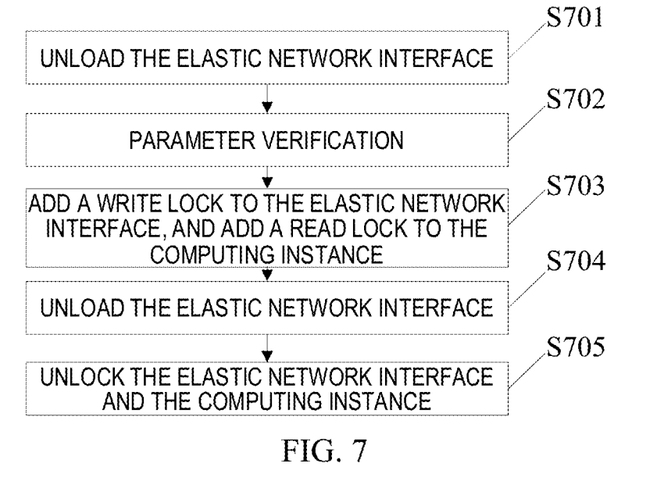
FIG. 7 is a schematic diagram of a method flow chart of unloading a network interface of the embodiments of the present application.

As shown in FIG. 7, for example, at step 701, an operation request to unload the elastic network interface is received. At step 702, the operation request is verified, including whether the parameters of the elastic network interface comply with the requirements, and whether the computing instance on which the elastic network interface depends exists. At step 703, if the parameter verification passes, the lock state of the elastic network interface is set as adding write lock, the lock state of the computing instance is set as adding read lock, and the number of read locks is increased by one. At step 704, the elastic network interface is unloaded from the computing instance. At step 705, the elastic network interface and the computing instance are unlocked, the lock state of the elastic network interface is set as unlock, and the number of read locks of the computing instance is decreased by one. If the number of read locks is zero, the lock state is set as unlock. It can be seen that unloading the elastic network interface is different from mounting the elastic network interface. Unloading the elastic network interface does not need to monopolize the computing instance. When unloading the elastic network interface, read lock is added to the computing instance, which may concurrently unload multiple elastic network interfaces from the computing instance.

In some embodiments, the target operation is to bind or unbind the elastic network interface to the security group, and the lock parameter includes a lock state;

setting, according to the target operation, the lock parameter for locking the elastic network interface and the associated resource comprises:
setting a lock state of the elastic network interface as adding write lock; and
setting a lock state of the security group as adding read lock, and adding the number of read locks of the security group by one; and
setting the lock parameter for unlocking the elastic network interface and the associated resource comprises:
setting the lock state of the elastic network interface as unlock; and
decreasing the number of read locks of the security group by one, and in response to the number of read locks of the security group being zero, setting the lock state of the security group as unlock.

In this embodiment, when binding or unbinding the elastic network interface with the security group, the lock state of the elastic network interface is set as adding write lock, the lock state of the security group is set as adding read lock, and the number of read locks is increased by one. After the elastic network interface with adding write lock is bound or unbound with the security group, the lock state of the elastic network interface is set as unlock, the number of read locks is decreased in the security group by one, and the lock state of the security group is set as unlock when judging that the number of read locks in the security group is zero, thus completing the binding or unblinding of the elastic network interface with the security group. Adding write lock to the elastic network interface may ensure that no other operations may be performed on the elastic network interface during the binding or unbinding process to avoid errors. Adding read lock to the security group may ensure that the elastic network interface may no longer perform write operations during the binding or unbinding process, so as to prevent the elastic network interface from making errors due to the deletion or modification of the resources it depends on during the binding or unbinding process. At the same time, the security group with adding read lock may also perform read operations, that is, support concurrent read operations, such as concurrent binding or unbinding of the elastic network interface under the security group.

Figure 8:
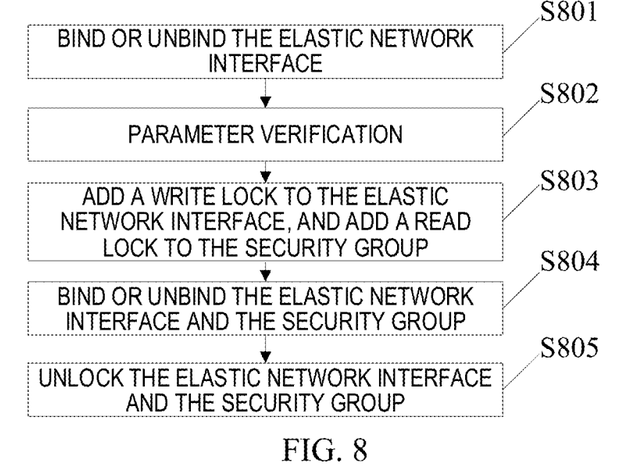
FIG. 8 is a schematic diagram of a method flow chart of binding/unbinding a network interface of the embodiments of the present application.

As shown in FIG. 8, for example, at step 801, an operation request of binding or unbinding the elastic network interface with the security group is received. At step 802, the operation request is verified, including whether the parameters of the elastic network interface comply with the requirements, and whether the security group that the elastic network interface depends on exists. At step 803, if the parameter verification passes, the lock state of the elastic network interface is set as adding write lock, the lock state of the security group is set as adding read lock, and the number of read locks is increased by one. At step 804, the elastic network interface is bound or unbound with the security group. At step 805, the elastic network interface and the security group are unlocked, the lock state of the elastic network interface is set as unlock, and the number of read locks of the security group is decreased by one. If the number of read locks is zero, the lock state is set as unlock. It can be seen that during the binding or unbinding process between the elastic network interface and the security group, the elastic network interface is added write lock, and no other operations may be performed. The security group is added read lock, and concurrent read operations may be performed on the security group. It can also be understood that when the elastic network interface is bound or unbound with the security group, the security group on which the elastic network interface depends should exist, instead of monopolizing the security group, so only adding read lock is need instead of adding write lock, so multiple elastic network interface may be bound or unbound with the security group concurrently.

In some embodiments, the target operation may further be to query the elastic network interface. When querying the elastic network interface, there is no need to lock the elastic network interface and associated resource that have a dependency relationship on it, that is, to support a concurrent query of resource operation operations.

In some embodiments, setting, according to the target operation, the lock parameter for locking the elastic network interface and the associated resource further comprises:
  setting, according to the target operation, a state of the elastic network interface to be performing the target operation; and
  setting the lock parameter for unlocking the elastic network interface and the associated resource further comprises:
  setting the state of the elastic network interface to be completing the target operation.

In this embodiment, all kinds of resources in the private network are not only configured with lock parameters, but also configured with the states of the resources themselves, so that users may easily query and obtain the current state of the elastic network interface. For the state of the elastic network interface, when locking the lock parameters of the elastic network interface and its associated resource with a dependency relationship, the state of the elastic network interface is set to be performing the target operation, for example, the elastic network interface is being created, the elastic network interface is being mounted, the elastic network interface is being unloaded, and the elastic network interface is being deleted. When unlocking the elastic network interface and associated resource, it is considered that the target operation on the elastic network interface has been completed, and the state of the target operation is set as completing the target operation, for example, the creation of the elastic network interface is complete (or the creation is completed and available), and the mounting of the elastic network interface is complete (or the mounting is completed and in use).

In some embodiments, after receiving the resource operation request, it further includes:
  receiving a query request for a resource state, wherein the query request for the resource state is used for indicating to query the state of the elastic network interface; and
  sending a state result response comprising the state of the elastic network interface.

In this embodiment, the user needs to actively query the current state of resources after configuring resources. After a query request for a resource state is sent, the current state of the elastic network interface to be queried may be obtaining, so that whether the resource configuration is successful may be judged according to the current state of the elastic network interface obtained. For example, after the user creates the elastic network interface, he sends a query request for a resource state. When receiving that elastic network interface is being created, it indicates that the elastic network interface has not been created yet. When receiving that elastic network interface has been created and is available, it indicates that the elastic network interface has been created and may be used to mount the computing instance.

In some embodiments, performing the target operation on the locked elastic network interface comprises:
  calling at least one component associated to the elastic network interface to sequentially perform the target operation.

Figure 10:
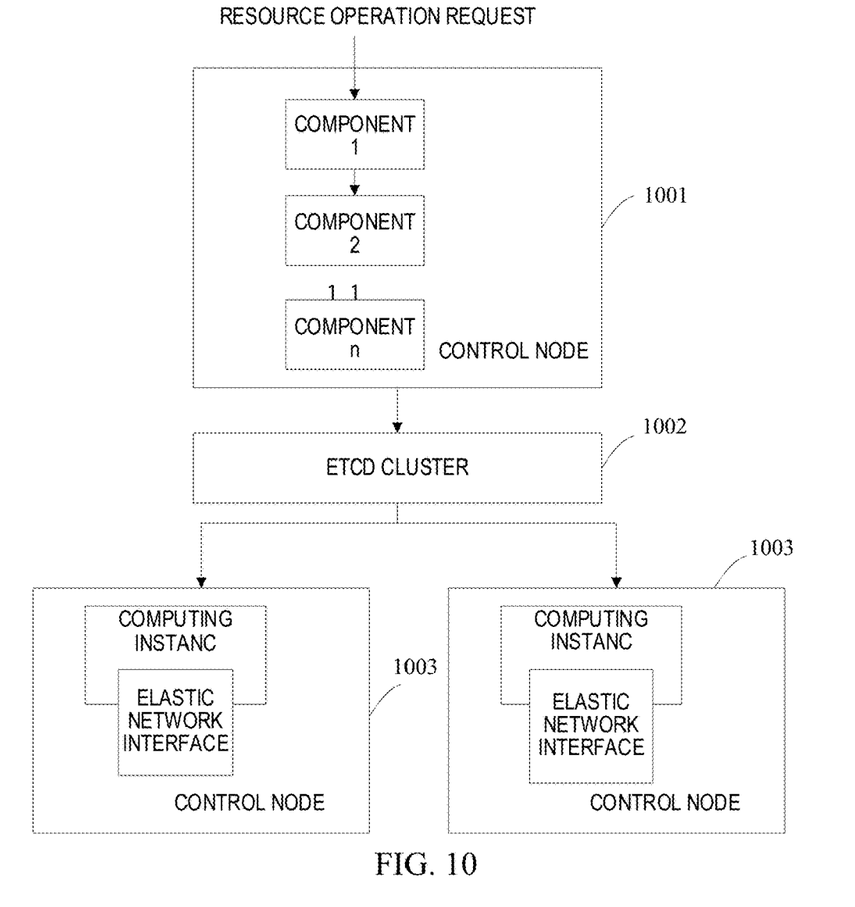
FIG. 10 is a schematic diagram of a system architecture of the embodiments of the present application.

In this embodiment, in combination with an application scenario shown in FIG. 10, a control node 1001 includes a plurality of components, herein, a component 1 is a user-oriented service component for receiving resource operation request. The component 1 determines an associated resource with a dependency relationship according to the elastic network interface in the resource operation request, lock parameters for the elastic network interface and associated resource are set, the state of the elastic network interface is set, and a target operation is performed according to the target operation; After the component 1 performs the target operation, it calls other components associated with the elastic network interface to perform the target operation sequentially, and each component returns the operation execution results sequentially. When all components complete the target operation, the elastic network interface and associated resource are unlocked, and the state of the elastic network interface is set. In some ways, other components include but are not limited to resource arrangement components, key value database components, etc. The functions and specific operation process of each component will not be described. Compared with the read/write lock operation in the related technology, the elastic network interface is in the lock state during the operation, and it is unlocked only after all components have completed the operation. Therefore, the lock state of the resource is maintained during the coordinated operation of each component, with a longer life cycle.

An ETCD cluster 1002 carries data from the control node 1001 and distributes data to various computing nodes 1003. Due to the large number and scale of computing node 1003 and the small number of control node 1001, each computing node 1003 directly obtains data from the control node 1001, which puts great pressure on the control node 1001. Therefore, the ETCD cluster 1002 is used to achieve data scheduling and transmission between the control node 1001 and computing node 1003. The compute node 1003 is a node that deploys the private network, and users may implement unique business functions through the compute node 1003.

Figure 9:
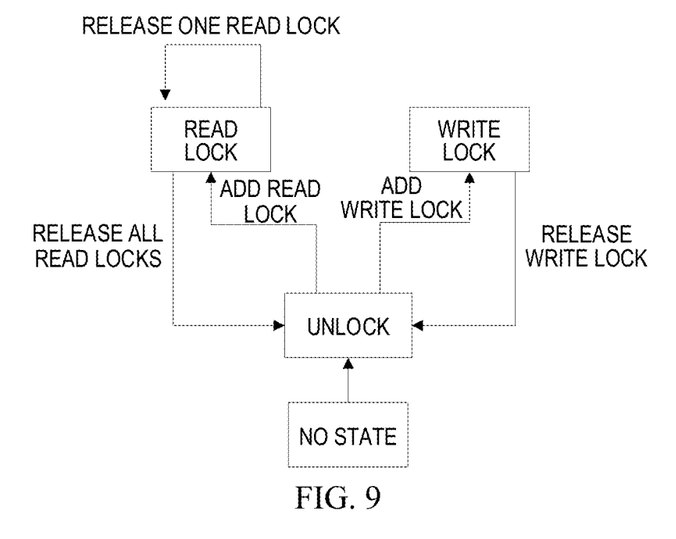
FIG. 9 is a schematic diagram of a read-write lock state machine of the embodiments of the present application.

Referring to FIG. 9, this embodiment provides a method of resource operation, which sets lock parameters for various resources in the private network, determines a dependency relationship between resources, and implements resource related operations based on the read-write lock mechanism. When adding write lock to a resource, no other read or write operations may be performed on the resource. When adding read lock to a resource, read operations may be performed on the resource, but no write operations may be performed. Concurrent read operations may be implemented. When performing a target operation on the elastic network interface, an associated resource that have a dependency relationship on the elastic network interface is first determined, and then the elastic network interface and associated resource are set as adding read lock or write lock according to the type of target operation to ensure the correctness of the operation. The resource with adding read lock may implement concurrent operations, thereby improving system performance. After the target operation is completed, the elastic network interface and associated resource is unlocked to complete the operation. The method of this embodiments does not need to lock the private network when operating a certain resource, but only locks the resource and dependent resources. Adding read lock supports concurrent operations, which may improve system performance and meet the requirements of concurrent operations. Especially in a scenario of concurrent operation of elastic network interface, it may significantly improve the number of operation requests per unit time and reduce the processing time of single operation requests.

It should be noted that the method of the embodiments of the present application may be executed by a single device, such as a computer or server. The method of this embodiment may also be applied to a distributed scenario, which is completed by multiple devices cooperating with each other. In this distributed scenario, one of these multiple devices may only perform one or more steps in the method of the embodiments of the present application, and these multiple devices will interact with each other to complete the method.

It should be noted that some embodiments of the present application are described above. Other embodiments are within the scope of the appended claims. In some cases, the actions or steps recorded in the claims may be performed in an order different from that in the above embodiments and the desired result may still be achieved. In addition, the process depicted in the drawings does not necessarily require a specific or continuous order to achieve the desired results. In some implementations, multitasking and parallel processing are also possible or may be advantageous.

Based on the same inventive concept, the present application also provides an apparatus for resource operation corresponding to the method of any of the above embodiments.

Figure 11:
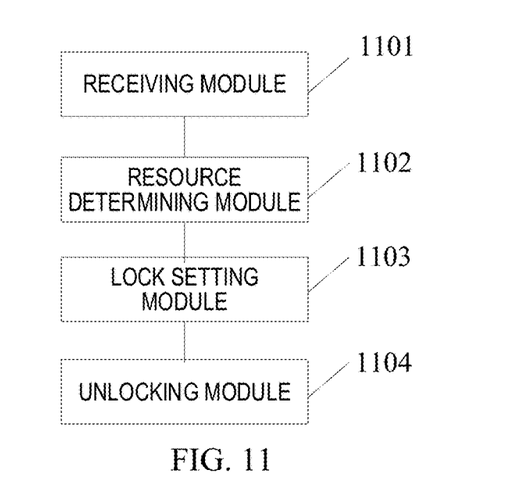
FIG. 11 is a structural schematic diagram of an apparatus of the embodiments of the present application.

Referring to FIG. 11, the apparatus for resource operation comprises:

a receiving module 1101 configured to receive a resource operation request, wherein the resource operation request is used for indicating to perform a target operation on an elastic network interface;

a resource determining module 1102 configured to determine, according to the elastic network interface, an associated resource having a dependency relationship with the elastic network interface, wherein the associated resource comprises at least one of: a sub-network for allocating an address to the elastic network interface, a security group for binding the elastic network interface, or a computing instance for mounting the elastic network interface;

a lock setting module 1103 configured to set, according to the target operation, a lock parameter for locking the elastic network interface and the associated resource; and an unlocking module 1104 configured to set, after performing the target operation on the locked elastic network interface, a lock parameter for unlocking the elastic network interface and the associated resource.

For the convenience of description, the above apparatus is described in terms of functions divided into various modules. Of course, in implementing the present application, the functions of each module may be implemented in the same or multiple software and/or hardware.

The apparatus of the above embodiments is used to implement the presentation method of the corresponding pop-up effect in any of the above embodiments, and has the beneficial effect of the corresponding method embodiments, which will not be repeated here.

Based on the same concept, corresponding to any of the above embodiment methods, the present application also provides an electronic device, including a memory, a processor, and a computer program stored in the memory and executable on the processor. The processor implements, when executes the program, the method of target positioning described in any of the above embodiments.

It can be seen from the above description that the present application provides a method, apparatus, electronic device and storage medium for resource operation. When performing a target operation on an elastic network card, according to the elastic network interface, an associated resource having a dependency relationship with the elastic network interface is determined. According to the target operation, a lock parameter for locking the elastic network interface and the associated resource is set. After performing the target operation on the locked elastic network interface, a lock parameter for unlocking the elastic network interface and the associated resource is set. A private network does not need to be locked, but an elastic network card to be operated and an associated resource dependent thereon are locked. In this way, operations performed on resources in the private network except the elastic network interface and the associated resource are not affected. In addition, a resource added by read lock supports concurrent operations, thereby ensuring correctness of resource operations and improving processing performance.

Figure 12:
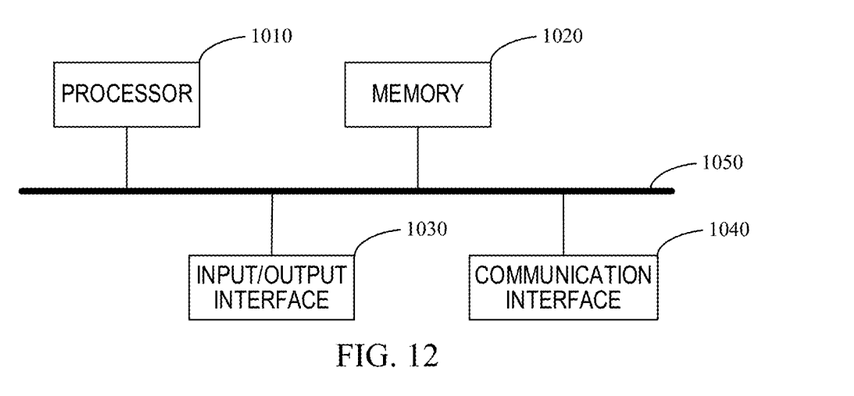
FIG. 12 is a structural schematic diagram of an electronic device of the embodiments of the present application.

FIG. 12 illustrates a more specific schematic diagram of a hardware structure of an electronic device provided in the embodiments of the present application. The device may include: a processor 1010, a memory 1020, input/output interface 1030, a communication interface 1040 and bus 1050. The processor 1010, the memory 1020, the input/output interface 1030 and the communication interface 1040 implement communication connections between each other within the device through the bus 1050.

The processor 1010 may be implemented using a general-purpose Central Processing Unit (CPU), a microprocessor, an Application Specific Integrated Circuit (ASIC), or one or more integrated circuits, etc., for executing related programs to implement the technical solution provided by the embodiments of the present specification.

The memory 1020 may be implemented using a Read Only Memory (ROM), a Random Access Memory (RAM), a static storage device, a dynamic storage device, etc. The memory 1020 may store operating systems and other application programs. When implementing the technical solution provided in the embodiments of this specification by software or firmware, the relevant program code is stored in the memory 1020 and executed by the processor 1010.

The input/output interface 1030 is used to connect an input/output module to achieve information input and output. The input/output module may be configured as a component in the device (not shown in the figure) or externally connected to the device to provide corresponding functions. The input device may include a keyboard, mouse, touch screen, microphone, various sensors, etc., and the output device may include a display, speaker, vibrator, indicator light, etc.

The communication interface 1040 is configured to connect a communication module (not shown in the figure) to achieve communication interaction between this device and other devices. The communication module may communicate through wired methods (such as USB, network cable, etc.) or wireless methods (such as mobile networks, WIFI, Bluetooth, etc.).

The bus 1050 includes a path to transmit information between the respective components of the device (e.g., the processor 1010, the memory 1020, the input/output interface 1030 and the communication interface 1040).

It should be noted that, although the above device only illustrates the processor 1010, the memory 1020, the input/output interface 1030, the communication interface 1040 and the bus 1050, but in the specific implementation process, the device may also include other components necessary for normal operation. In addition, those skilled in the art will appreciate that the above device may include only the components necessary to implement the embodiments of the present specification, without necessarily including all the components shown in the figures.

The electronic device of the above embodiments is configured for implementing any of the foregoing embodiments corresponding to the method of target positioning and has the beneficial effects of the corresponding method embodiment, not described herein again.

Based on the same inventive concept and corresponding to the method of any of the above embodiments, the present application further provides a non-transitory computer readable storage medium having stored computer instructions which cause a computer to perform the method of resource operation according to any of the embodiments described above.

The computer readable medium of the embodiments of the present application includes both permanent and non-permanent, removable and non-removable media that may be implemented by any method or technology for storing information. Information may be computer-readable instructions, data structures, modules of programs, or other data. Examples of storage medium for computers include, but are not limited to, Phase-change Random Access Memory (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory, or other memory technologies, Compact Disc Read-Only Memory (CD-ROM), Digital Versatile Disc (DVD), or other optical storage, magnetic cassettes, magnetic tape magnetic disk storage, or other magnetic storage devices or any other non-transmission media that may be used to store information to be accessed by computing devices.

The computer instructions stored in the storage medium of the above-described embodiments are used to cause the computer to perform the method of target positioning according to any of the embodiments and has the beneficial effects of the corresponding method embodiments, which will not be described again here.

It should be noted that, unless otherwise defined, the technical terms or scientific terms used in the embodiments of the present application should have a common meaning understood by those with general skills in the field to which the present application belongs. The words "first", "second" and similar words used in the embodiments of the present application do not mean any order, quantity or importance, but are only used to distinguish different components. Words such as "including" or "containing" refer to components or objects that appear before the word, including those listed after the word and their equivalents, without excluding other components or objects. Words like "connecting" or "connected" are not limited to physical or mechanical connections, but can include electrical connections, whether direct or indirect. The article "a" or "an" before an element does not exclude the existence of multiple such elements.

Although the spirit and principle of the present application have been described with reference to several detailed description, it should be understood that the present application is not limited to the disclosed detailed description, and the division of various aspects does not mean that the features in these aspects cannot be combined to benefit, and such division is only for the convenience of expression. The present application is intended to cover various modifications and equivalent arrangements included in the spirit and scope of the appended claims. The scope of the appended claims conform to the broadest interpretation, thus including all such modifications and equivalent structures and functions.

What is claimed is:

1. A method of resource operation, comprising:
   receiving a resource operation request, wherein the resource operation request is used for indicating to perform a target operation on an elastic network interface;
   determining, according to the elastic network interface, an associated resource having a dependency relationship with the elastic network interface, wherein the associated resource comprises at least one of: a sub-network for allocating an address to the elastic network interface, a security group for binding the elastic network interface, or a computing instance for mounting the elastic network interface;

setting, according to the target operation, a lock parameter for locking the elastic network interface and the associated resource; and setting, after performing the target operation on the locked elastic network interface, a lock parameter for unlocking the elastic network interface and the associated resource.

2. The method of claim 1, wherein the target operation is to create the elastic network interface, and the lock parameter comprises a lock state and the number of read locks;

setting, according to the target operation, the lock parameter for locking the elastic network interface and the associated resource comprises:

setting a lock state of the elastic network interface as adding write lock; and setting lock states of the sub-network and the security group both as adding read lock, and increasing the number of read locks of each of the sub-network and the security group by one; and setting the lock parameter for unlocking the elastic network interface and the associated resource comprises:

setting the lock state of the elastic network interface as unlock; and decreasing the number of read locks of the sub-network and the number of read locks of the security group by one, and in response to the number of read locks of the sub-network and/or the security group being zero, setting the lock state of the sub-network and/or the security group as unlock.

3. The method of claim 1, wherein the target operation is to delete the elastic network interface, and the lock parameter comprises a lock state and the number of read locks;

setting, according to the target operation, the lock parameter for locking the elastic network interface and the associated resource comprises:

setting a lock state of the elastic network interface as adding write lock; and setting the lock state of the security group as adding read lock, and increasing the number of read locks by one; and setting the lock parameter for unlocking the elastic network interface and the associated resource comprises:

setting the lock state of the elastic network interface as unlock; and decreasing the number of read locks of the security group by one, and in response to the number of read locks of the security group being zero, setting the lock state of the security group as unlock.

4. The method of claim 1, wherein the target operation is to mount the elastic network interface to the computing instance, and the lock parameter comprises a lock state;

setting, according to the target operation, the lock parameter for locking the elastic network interface and the associated resource comprises:

setting lock states of the elastic network interface and the computing instance both as adding write lock; and setting the lock parameter for unlocking the elastic network interface and the associated resource comprises:

setting the lock states of the elastic network interface and the computing instance both as unlock.

5. The method of claim 1, wherein the target operation is to unload the elastic network interface from the computing instance, and the lock parameter comprises a lock state and the number of read locks;

setting, according to the target operation, the lock parameter for locking the elastic network interface and the associated resource comprises:

setting a lock state of the elastic network interface as adding write lock; and setting a lock state of the computing instance as adding read lock, and increasing the number of read locks of the computing instance by one; and setting the lock parameter for unlocking the elastic network interface and the associated resource comprises:

setting the lock state of the elastic network interface as unlock; and decreasing the number of read locks of the computing instance by one, and in response to the number of read locks of the computing instance being zero, setting the lock state of the computing instance as unlock.

6. The method of claim 1, wherein the target operation is to bind or unbind the elastic network interface and the security group, and the lock parameter comprises a lock state;

setting, according to the target operation, the lock parameter for locking the elastic network interface and the associated resource comprises:

setting a lock state of the elastic network interface as adding write lock; and setting a lock state of the security group as adding read lock, and adding the number of read locks of the security group by one; and setting the lock parameter for unlocking the elastic network interface and the associated resource comprises:

setting the lock state of the elastic network interface as unlock; and decreasing the number of read locks of the security group by one, and in response to the number of read locks of the security group being zero, setting the lock state of the security group as unlock.

7. The method of claim 1, wherein the lock parameter further comprises a lock annotation for identifying the target operation.

8. The method of claim 1, wherein setting, according to the target operation, the lock parameter for locking the elastic network interface and the associated resource further comprises:

setting, according to the target operation, a state of the elastic network interface to be performing the target operation; and setting the lock parameter for unlocking the elastic network interface and the associated resource further comprises:

setting the state of the elastic network interface to be completing the target operation.

9. The method of claim 8, wherein after receiving the resource operation request, the method further comprises:

receiving a query request for a resource state, wherein the query request for the resource state is used for indicating to query the state of the elastic network interface; and sending a state result response comprising the state of the elastic network interface.

10. The method of claim 1, wherein performing the target operation on the locked elastic network interface comprises:

calling at least one component associated to the elastic network interface to sequentially perform the target operation.

11. An electronic device, comprising a memory, a processor, and a computer program stored in the memory and run on the processor, wherein the processor, when executing the program, implements acts of resource operation, the acts comprising:

receiving a resource operation request, wherein the resource operation request is used for indicating to perform a target operation on an elastic network interface;

determining, according to the elastic network interface, an associated resource having a dependency relationship with the elastic network interface, wherein the associated resource comprises at least one of: a sub-network for allocating an address to the elastic network interface, a security group for binding the elastic network interface, or a computing instance for mounting the elastic network interface;

setting, according to the target operation, a lock parameter for locking the elastic network interface and the associated resource; and setting, after performing the target operation on the locked elastic network interface, a lock parameter for unlocking the elastic network interface and the associated resource.

12. The device of claim 11, wherein the target operation is to create the elastic network interface, and the lock parameter comprises a lock state and the number of read locks;

setting, according to the target operation, the lock parameter for locking the elastic network interface and the associated resource comprises:

setting a lock state of the elastic network interface as adding write lock; and setting lock states of the sub-network and the security group both as adding read lock, and increasing the number of read locks of each of the sub-network and the security group by one; and setting the lock parameter for unlocking the elastic network interface and the associated resource comprises:

setting the lock state of the elastic network interface as unlock; and decreasing the number of read locks of the sub-network and the number of read locks of the security group by one, and in response to the number of read locks of the sub-network and/or the security group being zero, setting the lock state of the sub-network and/or the security group as unlock.

13. The device of claim 11, wherein the target operation is to delete the elastic network interface, and the lock parameter comprises a lock state and the number of read locks;

setting, according to the target operation, the lock parameter for locking the elastic network interface and the associated resource comprises:

setting a lock state of the elastic network interface as adding write lock; and setting the lock state of the security group as adding read lock, and increasing the number of read locks by one; and setting the lock parameter for unlocking the elastic network interface and the associated resource comprises:

setting the lock state of the elastic network interface as unlock; and decreasing the number of read locks of the security group by one, and in response to the number of read locks of the security group being zero, setting the lock state of the security group as unlock.

14. The device of claim 11, wherein the target operation is to mount the elastic network interface to the computing instance, and the lock parameter comprises a lock state;

setting, according to the target operation, the lock parameter for locking the elastic network interface and the associated resource comprises:

setting lock states of the elastic network interface and the computing instance both as adding write lock; and setting the lock parameter for unlocking the elastic network interface and the associated resource comprises:

setting the lock states of the elastic network interface and the computing instance both as unlock.

15. The device of claim 11, wherein the target operation is to unload the elastic network interface from the computing instance, and the lock parameter comprises a lock state and the number of read locks;

setting, according to the target operation, the lock parameter for locking the elastic network interface and the associated resource comprises:

setting a lock state of the elastic network interface as adding write lock; and setting a lock state of the computing instance as adding read lock, and increasing the number of read locks of the computing instance by one; and setting the lock parameter for unlocking the elastic network interface and the associated resource comprises:

setting the lock state of the elastic network interface as unlock; and decreasing the number of read locks of the computing instance by one, and in response to the number of read locks of the computing instance being zero, setting the lock state of the computing instance as unlock.

16. The device of claim 11, wherein the target operation is to bind or unbind the elastic network interface and the security group, and the lock parameter comprises a lock state;

setting, according to the target operation, the lock parameter for locking the elastic network interface and the associated resource comprises:

setting a lock state of the elastic network interface as adding write lock; and setting a lock state of the security group as adding read lock, and adding the number of read locks of the security group by one; and setting the lock parameter for unlocking the elastic network interface and the associated resource comprises:

setting the lock state of the elastic network interface as unlock; and decreasing the number of read locks of the security group by one, and in response to the number of read locks of the security group being zero, setting the lock state of the security group as unlock.

17. The device of claim 11, wherein the lock parameter further comprises a lock annotation for identifying the target operation.

18. The device of claim 11, wherein setting, according to the target operation, the lock parameter for locking the elastic network interface and the associated resource further comprises:

setting, according to the target operation, a state of the elastic network interface to be performing the target operation; and setting the lock parameter for unlocking the elastic network interface and the associated resource further comprises:

setting the state of the elastic network interface to be completing the target operation.

19. The device of claim 18, wherein after receiving the resource operation request, the acts further comprise:

receiving a query request for a resource state, wherein the query request for the resource state is used for indicating to query the state of the elastic network interface; and sending a state result response comprising the state of the elastic network interface.

20. A non-transitory computer readable storage medium having computer instructions stored therein, wherein the computer instructions are used to enable a computer to perform acts of resource operation, the acts comprising:

receiving a resource operation request, wherein the resource operation request is used for indicating to perform a target operation on an elastic network interface;

determining, according to the elastic network interface, an associated resource having a dependency relationship with the elastic network interface, wherein the associated resource comprises at least one of: a sub-network for allocating an address to the elastic network interface, a security group for binding the elastic network interface, or a computing instance for mounting the elastic network interface;

setting, according to the target operation, a lock parameter for locking the elastic network interface and the associated resource; and setting, after performing the target operation on the locked elastic network interface, a lock parameter for unlocking the elastic network interface and the associated resource.

* * * * *